United States Patent
Kim

(10) Patent No.: US 12,398,772 B2
(45) Date of Patent: Aug. 26, 2025

(54) ELECTRONIC MECHANICAL BRAKE

(71) Applicant: HYUNDAI MOBIS Co., Ltd., Seoul (KR)

(72) Inventor: Jong Sung Kim, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 892 days.

(21) Appl. No.: 17/531,155

(22) Filed: Nov. 19, 2021

(65) Prior Publication Data

US 2022/0178413 A1 Jun. 9, 2022

(30) Foreign Application Priority Data

Dec. 3, 2020 (KR) .................. 10-2020-0167200

(51) Int. Cl.
| | | |
|---|---|---|
| *F16D 65/18* | (2006.01) | |
| *F16D 55/227* | (2006.01) | |
| *F16D 121/24* | (2012.01) | |
| *F16D 125/48* | (2012.01) | |
| *F16D 127/06* | (2012.01) | |
| *F16D 129/08* | (2012.01) | |

(52) U.S. Cl.
CPC ........... *F16D 65/18* (2013.01); *F16D 55/227* (2013.01); *F16D 2121/24* (2013.01); *F16D 2125/48* (2013.01); *F16D 2127/06* (2013.01); *F16D 2129/08* (2013.01)

(58) Field of Classification Search
CPC ..... F16D 65/18; F16D 55/227; F16D 2121/24
See application file for complete search history.

(56) References Cited

U.S. PATENT DOCUMENTS

| 6,651,784 B1 * | 11/2003 | Barbosa | F16D 65/567 |
| | | | 188/71.9 |
| 2010/0187049 A1 * | 7/2010 | Erben | F16D 65/18 |
| | | | 188/72.1 |
| 2019/0277355 A1 * | 9/2019 | Kim | F16D 65/18 |
| 2023/0296148 A1 * | 9/2023 | Heß | B60T 13/741 |
| | | | 188/72.6 |

FOREIGN PATENT DOCUMENTS

| DE | 102022134136 A1 * | 6/2023 | ........... B60T 13/741 |
| KR | 10-2011-0065218 A | 6/2011 | |

* cited by examiner

*Primary Examiner* — Vishal R Sahni
(74) *Attorney, Agent, or Firm* — Morgan, Lewis & Bockius LLP

(57) ABSTRACT

The present disclosure is mainly directed to simplifying a design structure of an electronic mechanical brake and reducing manufacturing costs by removing an elastic member and a friction member.

In addition, the present disclosure is also mainly directed to improving the performance of a brake by changing a shape of a caliper body so that the caliper body replaces a clamping force support structure, of which a function is performed by an elastic member and a friction member, and solving a brake instability problem.

6 Claims, 4 Drawing Sheets

ELECTRONIC MECHANICAL BRAKE

CROSS-REFERENCE TO RELATED APPLICATION

This application claims priority to and the benefit of Korean Patent Application No. 10-2020-0167200, filed on Dec. 3, 2020, the disclosure of which is incorporated herein by reference in its entirety.

BACKGROUND

1. Technical Field

The present disclosure relates to an electronic mechanical brake.

2. Discussion of Related Art

The contents described here provide only background information and do not constitute the related art.

A braking device is a device which generates a braking force in order to decrease a speed of a traveling vehicle, stop the traveling vehicle, or maintain a stopped state of the vehicle. When the speed of the vehicle decreases, kinetic energy of the vehicle is converted into thermal energy due to mechanical friction, and the thermal energy is released into the atmosphere so that the vehicle is braked.

Since a hydraulic pressure brake needs mechanical elements connected to a brake pedal of a driver's seat, hydraulic pressure tubes, elements for controlling hydraulic pressure, and the like, a structure thereof is complex. Accordingly, in order to simplify the structure of the braking device, an electro-mechanical brake (EMB) is developed and used. The EMB is divided into a drum type hydraulic pressure brake, a disc type hydraulic pressure brake, or the like. In the disc type hydraulic pressure brake among them, instead of a drum, friction pads press a disc which rotates with a wheel from both sides thereof to generate a braking force.

In addition, although the EMB is developed as an electronic parking brake (EPB), a use area of the EMB has recently expanded to a normal brake replacing the conventional hydraulic brake. The EMB is a braking device which performs electrically driven braking in which an actuator driven by a motor is directly installed on a brake caliper and directly presses a piston part using a motor driving force without a medium such as a brake fluid. The EMB has a mechanism similar to that of the EPB but has a difference in that the EMB is used as a normal braking device and requires higher braking responsiveness and operational durability than the EPB. In addition, when compared to a hydraulic brake, the EMB may have a simpler structure, a higher braking response speed, and more precise control so that braking safety performance can be improved.

In the conventional EMB, in order to perform a parking brake function, after a braking force is generated in a vehicle, a locking device using a solenoid or small motor is used to not release the braking force even when an engine is turned off. However, since the conventional EMB includes a gear, a solenoid, and the like to restrict an axis of the motor, there are disadvantages in that not only costs are high due to a complex structure, but also a size is large.

In order to solve such problems, one example of an EMB in which a solenoid locking device is not used is disclosed in Korean Laid-open Patent Publication No. 10-2011-0065218 (Jun. 15, 2011). However, since the EMB further includes components such as an elastic member and a friction member, there are problems in that the design is complicated and manufacturing costs are increased.

In addition, when a spindle is supported using the elastic member, since braking performance is degraded and a brake instability problem, for example, a problem of an increase in current consumption or a problem of abnormal brake noise, occurs, there is a problem in that the performance of the brake is degraded.

SUMMARY

The present disclosure is mainly directed to simplifying a design structure of an electronic mechanical brake and reducing manufacturing costs by removing an elastic member and a friction member.

In addition, the present disclosure is also mainly directed to improving the performance of a brake by changing a shape of a caliper body so that the caliper body replaces a clamping force support structure, of which a function is performed by an elastic member and a friction member, and solving a brake instability problem.

According to at least one aspect, the present disclosure provides an electronic mechanical brake including a piston which is movable forward or rearward in an axial direction and moves forward in the axial direction during a normal braking to press a friction pad provided to clamp a disc, and an actuator which provides a rotational force to move the piston, the electronic mechanical brake comprising: a spindle which includes a thrust bearing and a flange portion, is coupled to the piston to rotate according to the rotational force, and is configured to move the piston forward or rearward; and a caliper body which includes a thrust bearing support portion in contact with the thrust bearing, a friction force transmission portion which is spaced apart from the flange portion by a gap and comes into contact with the flange portion as the gap becomes narrower according to a linear movement of the spindle, and a bending portion which is positioned on an upper end of the thrust bearing support portion and connects the thrust bearing support portion to the friction force transmission portion, wherein the thrust bearing support portion has a thickness which is relatively greater than a thickness of the bending portion so that the thrust bearing support portion protrudes relatively further than the bending portion in a direction toward the thrust bearing, and the bending portion has the thickness which is relatively smaller than the thickness of the thrust bearing support portion so that the bending portion is deformed to allow the friction force transmission portion to come into contact with the spindle so as to transmit a friction force when a parking braking force is generated.

According to another aspect, the present disclosure provides an electronic mechanical brake including a piston which is movable forward or rearward in an axial direction and moves forward in the axial direction during a normal braking to press a friction pad provided to clamp a disc, and an actuator which provides a rotational force to move the piston, the electronic mechanical brake comprising: a spindle which includes a thrust bearing and a flange portion, is coupled to the piston to rotate according to the rotational force, and moves the piston forward or rearward; a caliper body including a thrust bearing support portion which is in contact with the thrust bearing and a bending portion connected to the thrust bearing support portion and configured to be deformed according to a load received from the thrust bearing; and a pressurized member which is in contact with the bending portion and presses the flange portion to generate a friction force, wherein the thrust bearing support portion has a thickness which is relatively greater than a thickness of the bending portion so that the thrust bearing support portion protrudes relatively further than the bending portion in a direction toward the thrust bearing, and the bending portion has the thickness which is relatively smaller than the thickness of the thrust bearing support portion so that the bending portion is deformed to allow the pressurized member to come into contact with the spindle so as to transmit a friction force when the electronic mechanical brake generates a parking braking force.

According to the present embodiment described above, there are effects of simplifying a design structure of an electronic mechanical brake and reducing manufacturing costs by removing an elastic member and a friction member.

In addition, there is also an effect of improving the performance of a brake by changing a shape of a caliper body so that the caliper body replaces a clamping force support structure, of which a function is performed by an elastic member and a friction member, and solving a brake instability problem.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

REFERENCE NUMERALS

Figure 1:
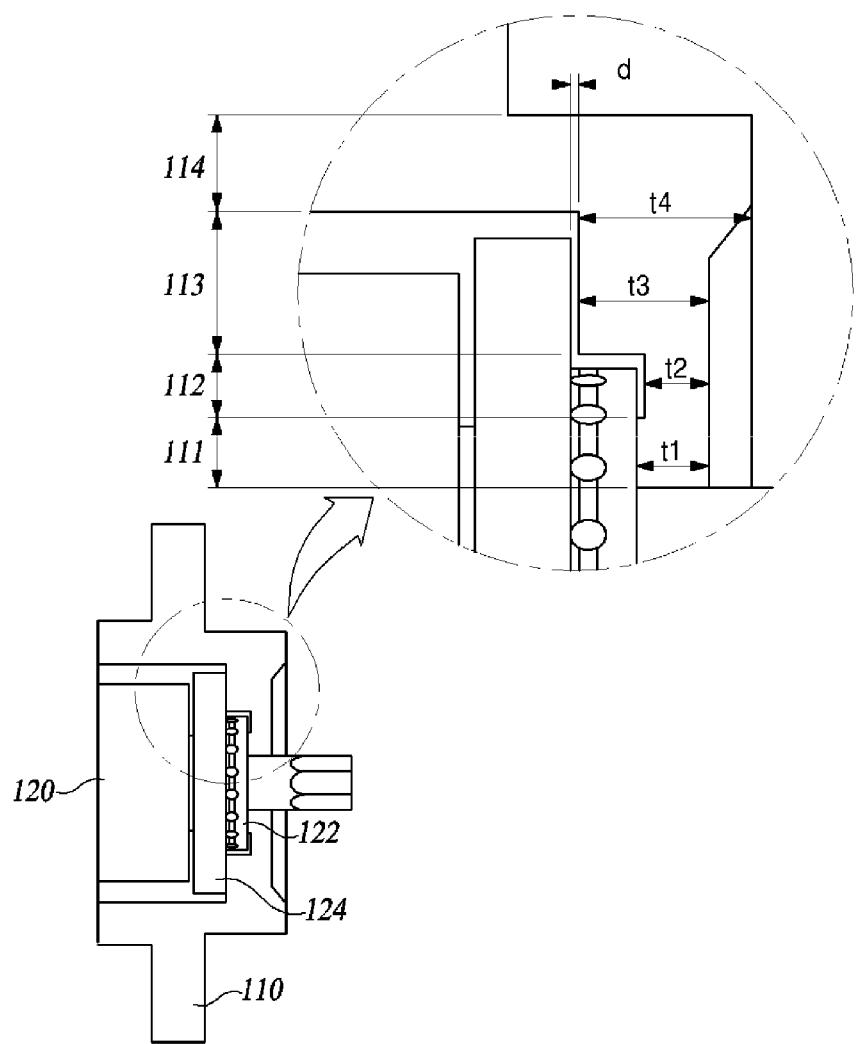
FIG. 1 shows a side cross-sectional view illustrating an electronic mechanical brake and an enlarged view illustrating a caliper body according to one embodiment of the present disclosure.

| | |
|---|---|
| 110: | caliper body |
| 111: | thrust bearing support portion |
| 112: | bending portion |
| 113: | friction force transmission portion |
| 114: | high load supporting portion |
| 120: | spindle |
| 122: | thrust bearing |
| 124: | flange portion |
| 210: | caliper body |
| 211: | thrust bearing support portion |
| 212: | bending portion |
| 213: | high load supporting portion |
| 220: | spindle |
| 222: | thrust bearing |
| 224: | flange portion |
| 230: | pressurized member |

DETAILED DESCRIPTION OF EXEMPLARY EMBODIMENTS

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'portion', 'module', and the like refer to one or more portions for processing at least one function or operation, which may be implemented by hardware, software, or a combination thereof.

FIG. 1 shows a side cross-sectional view illustrating an electronic mechanical brake and an enlarged view illustrating a caliper body according to one embodiment of the present disclosure.

An electronic mechanical brake 100 includes a piston (not shown) which is configured to move forward or rearward in an axial direction and moves forward to press a friction pad provided to clamp a disc during normal braking and an actuator (not shown) which provides a rotational force for moving the piston. Since general structures and descriptions related to the piston and the actuator correspond to technology which is clear to those skilled in the art, illustrations and descriptions thereof will be omitted.

Referring to FIG. 1, the electronic mechanical brake 100 according to one embodiment of the present disclosure includes a caliper body 110 and a spindle 120.

The caliper body 110 includes all or some of a thrust bearing support portion 111, a bending portion 112, a friction force transmission portion 113, and a high load supporting portion 114.

The thrust bearing support portion 111 supports a thrust bearing 122 so that the thrust bearing 122 may not move forward by a predetermined displacement more. For example, when the thrust bearing 122 moves forward to the right, the thrust bearing 122 presses the thrust bearing support portion 111. When the thrust bearing support portion 111 is pressed, the bending portion 112 may be stressed and deformed. Deformation of the bending portion 112 will be described below.

The bending portion 112 is positioned at an upper end of the thrust bearing support portion 111 and provided to connect the thrust bearing support portion 111 and the friction force transmission portion 113.

The electronic mechanical brake 100 according to one embodiment of the present disclosure does not include an elastic member, for example, a coil spring, of a conventional electronic mechanical brake. Accordingly, instead of the conventional elastic member, the bending portion 112 according to one embodiment of the present disclosure performs a function performed by the conventional elastic member.

The conventional electronic mechanical brake uses the elastic member for stopping rotation of a spindle. The elastic member provides an elastic restoring force which pushes a friction member positioned behind the elastic member forward. Based on the elastic restoring force, the friction member generates a friction force by coming into contact with the spindle to stop the rotation of the spindle.

Conversely, the bending portion 112 according to one embodiment of the present disclosure is deformed when receiving a load of the thrust bearing 122 pressing the thrust bearing support portion 111. For example, when the thrust bearing 122 presses the thrust bearing support portion 111 to the right, the bending portion 112 receives stress and is deformed, for example, is bent to the right. In the detailed description of exemplary embodiments, although it is described as being bent, actually, a degree of bending is insignificant. When the bending portion 112 is bent to the right, the friction force transmission portion 113 comes into contact with a flange portion 124. The flange portion 124 no longer rotates and stops because of a friction force generated when the flange portion 124 comes into contact with the friction force transmission portion 113.

That is, in the electronic mechanical brake 100 according to one embodiment of the present disclosure, as a shape of the caliper body 110 is designed as a step type like the enlarged view of FIG. 1, even when the electronic mechanical brake 100 does not include the elastic member, the same function may be performed using the bending portion 112. Accordingly, there are effects of simplifying a design structure of the electronic mechanical brake 100 and reducing manufacturing costs.

The friction force transmission portion 113 is disposed in the caliper body 110 to be spaced apart from the flange portion 124 by a gap d.

The friction force transmission portion 113 and the high load supporting portion 114 are members which bear a remaining load among a load of the thrust bearing 122 pressing the caliper body 110 excluding a load of the thrust bearing support portion 111 supporting the thrust bearing 122.

The friction force transmission portion 113 according to one embodiment of the present disclosure performs a function of the friction member included in the conventional electronic mechanical brake.

In the conventional electronic mechanical brake, in order to stop the spindle, the elastic member is compressed so that a friction force member separately provided on an inner side surface of a caliper body comes into contact with the spindle to generate a friction force. However, in one embodiment of the present disclosure, as the shape of the caliper body 110 is designed as a step type like the enlarged cross-sectional view of FIG. 1, even when the electronic mechanical brake 100 does not include the friction member, the same function may be performed using the friction force transmission portion 113. Accordingly, there are effects of simplifying a design structure of the electronic mechanical brake 100 and reducing manufacturing costs.

The high load supporting portion 114 is formed to be thicker than the friction force transmission portion 113 to distribute a load received by the friction force transmission portion 113. When the load received by the friction force transmission portion 113 is distributed, the durability of the friction force transmission portion 113 is improved, and thus there is an effect in that the friction force transmission portion 113 is not easily destroyed.

The spindle 120 includes the thrust bearing 122 and the flange portion 124.

The spindle 120 is configured to move forward or rearward according to rotation of the actuator. As the spindle 120 rotates, the thrust bearing 122 may move forward or rearward. The flange portion 124 may be connected to the thrust bearing 122 to move forward or rearward.

In the present disclosure, since a general structure and a description related to driving of the spindle 120 correspond to technology which is clear to those skilled in the art, an illustration and the description thereof will be omitted.

Hereinafter, the shape of the caliper body 110 will be described in detail.

In FIG. 1, thicknesses t1 to t4 are thicknesses of components of the caliper body. The thickness t1 is a thickness of the thrust bearing support portion 111, the thickness t2 is a thickness of the bending portion 112, the thickness t3 is a thickness of the friction force transmission portion 113, and the thickness t4 is the thickness of the high load supporting portion 114.

First, the thickness t1 is formed to be greater than the thickness t2. When the thicknesses t1 and t2 are the same, the bending portion 112 according to one embodiment of the present disclosure may not perform the function of the elastic member. Accordingly, in the electronic mechanical brake 100 according to one embodiment of the present disclosure, since the thickness t1 is formed to be greater than the thickness t2, when the caliper body 110 supports the thrust bearing 122, the caliper body 110 does not support the entire cross section of the thrust bearing 122 but supports only a local cross section. That is, since the bending portion 112 does not come into contact with the thrust bearing 122, the bending portion 112 may be deformed, for example, bent, by a predetermined angle.

The thicknesses t3 and t4 are formed to be relatively greater than the thicknesses t1 and t2. However, the thicknesses t3 and t4 are formed so that the friction force transmission portion 113 is spaced apart from the flange portion 124 by the gap d to not come into contact with the flange portion 124 in a state in which the electronic mechanical brake 100 does not operate. In addition, although the thicknesses t4 and t3 may be the same, since the thickness t4 is formed to be greater than the thickness t3, a load received by the friction force transmission portion 113 is further distributed.

The electronic mechanical brake according to one embodiment of the present disclosure generates a braking force in different ways according to a normal braking mode and a parking braking mode.

In the normal braking mode, only the thrust bearing support portion 111 comes into contact with the thrust bearing 122. Accordingly, a load generated when the friction pad (not shown) connected to a left side of the spindle 120 comes into contact with the disc is transmitted to the thrust bearing support portion 111.

Meanwhile, in the parking braking mode, a braking force, which is relatively greater than that in the normal braking mode, is required. For example, in a case in which a vehicle is parked on a hill, in order for the vehicle to not slip, the electronic mechanical brake 100 should generate a braking force which is greater than that in the case of the normal braking mode. Accordingly, the thrust bearing support portion 111 receives a relatively larger load from the thrust bearing 122. In this case, the bending portion 112 is deformed such that the gap d between the friction force transmission portion 113 and the flange portion 124 decreases gradually.

When the gap d becomes zero such that the friction force transmission portion 113 is in contact with the flange portion 124, the spindle 120 may no longer move forward to the left. In the detailed description of the exemplary embodiments, a condition in which the spindle 120 may no longer move forward in a leftward direction is referred to as self-locking.

As the spindle 120 enters the self-locking state, a parking braking force is generated in the electronic mechanical brake 100. That is, in the parking braking mode, there is a difference in that the friction force transmission portion 113 and the flange portion 124 come into contact when compared to the normal braking mode.

Meanwhile, the thickness of the friction force transmission portion 113 and the thickness of the high load supporting portion 114 may be variably changed. For example, in order to prevent a load from being concentrated on the bending portion 112, the thickness of the friction force transmission portion 113 and the thickness of the high load supporting portion 114 may be formed to be thicker.

As a length of the bending portion 112 increases, there is an effect in that the function of the elastic member may be more efficiently performed, but the bending portion 112 is vulnerable to a large load. Accordingly, by adjusting the thickness of the friction force transmission portion 113 and the thickness of the high load supporting portion 114, a load that the bending portion 112 may bear may be properly distributed.

Figure 2:
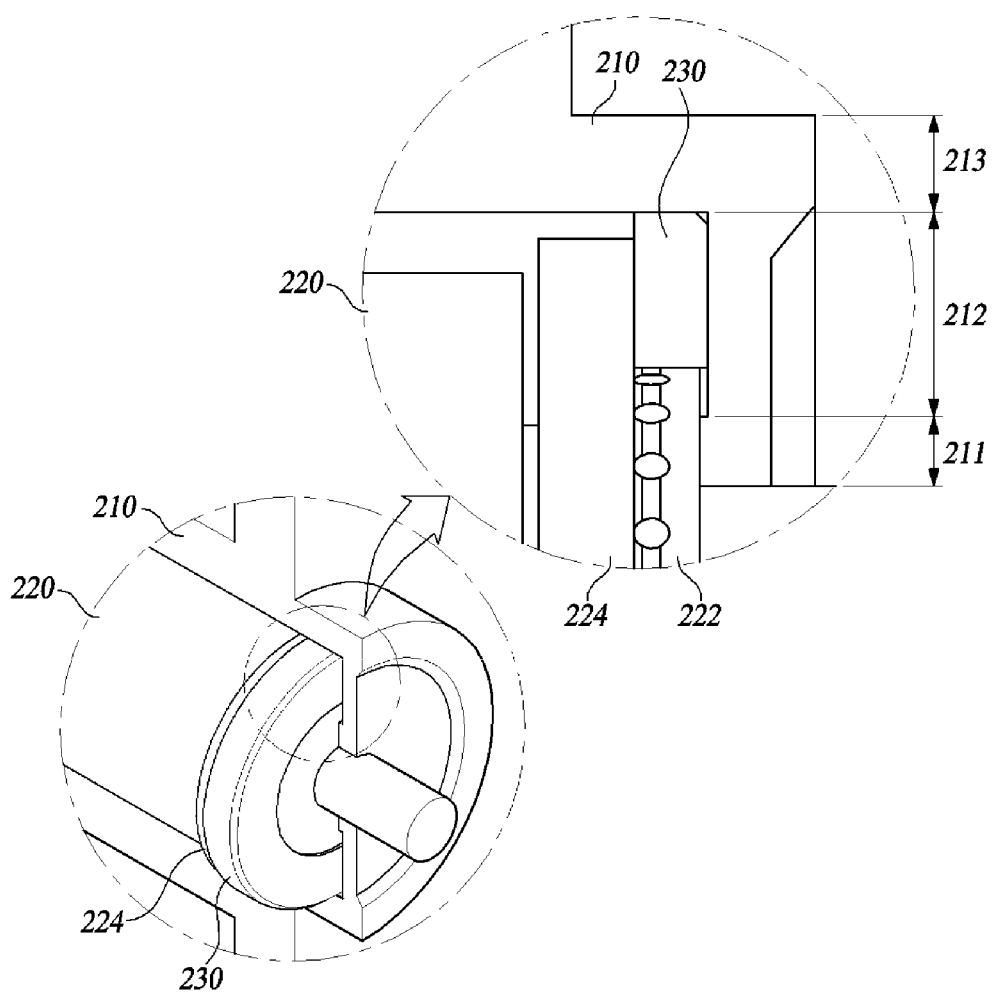
FIG. 2 shows a perspective view illustrating an electronic mechanical brake and an enlarged side cross-sectional view illustrating a caliper body according to another embodiment of the present disclosure.

FIG. 2 shows a perspective view illustrating an electronic mechanical brake and an enlarged side cross-sectional view illustrating a caliper body according to another embodiment of the present disclosure.

Differences of an electronic mechanical brake 200 according to another embodiment of the present disclosure from the electronic mechanical brake 100 according to one embodiment of the present disclosure will be mainly described.

Referring to FIG. 2, the electronic mechanical brake 200 according to another embodiment of the present disclosure includes a caliper body 210, a spindle 220, and a pressurized member 230. That is, the electronic mechanical brake 200 according to another embodiment of the present disclosure further includes the pressurized member 230 when compared to the electronic mechanical brake 100 according to one embodiment of the present disclosure.

The caliper body 210 is formed in a shape different from that of the caliper body 110 of FIG. 1.

The caliper body 210 does not include the friction force transmission portion 113 (see FIG. 1) when compared to the caliper body 110 of FIG. 1. Accordingly, the caliper body 210 includes all or some of a thrust bearing support portion 211, a bending portion 212, and a high load supporting portion 213.

Since the thrust bearing support portion 211 and the high load supporting portion 213 performs functions which are the same as those of the thrust bearing support portion 111 and the high load supporting portion 114 of FIG. 1, detailed descriptions thereof will be omitted.

Since the electronic mechanical brake 200 according to another embodiment of the present disclosure does not include the friction force transmission portion 113, the bending portion 212 may be formed in a shape which is longer than that of the bending portion 112 of FIG. 1.

In terms of the bending portion 212 performing the function of an elastic member, the bending portion 212 is the same as that of FIG. 1, but there is a difference in length of the bending portion 212. When the length of the bending portion 212 increases, since the bending portion 212 is more easily bent when performing the function of the elastic member, there is an effect of decreasing a gap d using a smaller load.

The spindle 220 includes a thrust bearing 222 and a flange portion 224, and functions of the thrust bearing 222 and the flange portion 224 are the same as those of the thrust bearing 122 and the flange portion 124 described with respect to FIG. 1.

The pressurized member 230 performs a function similar to that of a friction member of a conventional electronic mechanical braking device.

Accordingly, since the electronic mechanical brake 200 according to another embodiment of the present disclosure does not include an elastic member when compared to the conventional electronic mechanical brake, there are effects of simplifying a design structure of the electronic mechanical brake 200 and reducing manufacturing costs.

Figure 3:
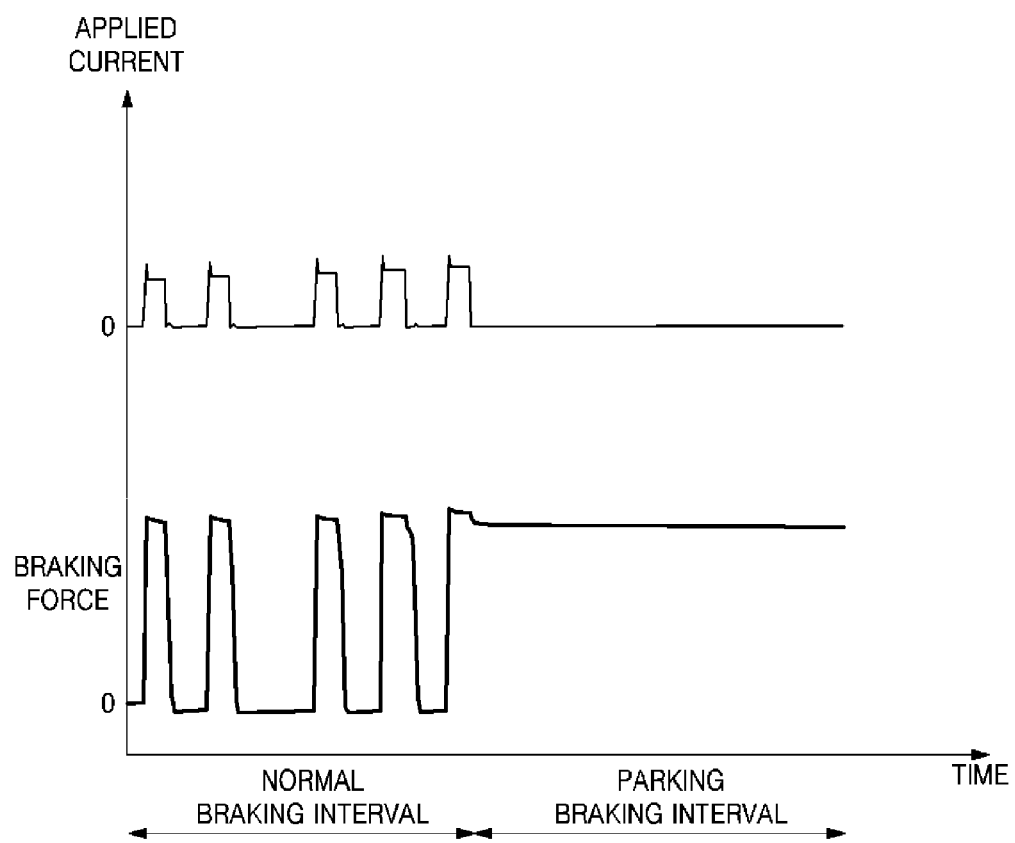
FIG. 3 is a graph showing a braking force and a current which are generated over time when the electronic mechanical brake according to one embodiment of the present disclosure generates a normal braking force and a parking braking force.

FIG. 3 is a graph showing a braking force and a current which are generated over time when the electronic mechanical brake according to one embodiment of the present disclosure generates a normal braking force and a parking braking force.

Referring to FIG. 3, an upper graph shows a flow of a current flowing in the actuator over time, and a lower graph shows a braking force in the electronic mechanical brake 100 over time.

In a normal braking interval of the upper graph, when a driver depresses a brake pedal, a current flowing in the actuator increases temporarily, and when a braking force is released, the current decreases to zero.

On the other hand, in a parking braking interval, there is no current flow in the actuator.

Meanwhile, in the normal braking interval of the lower graph, when the driver depresses the brake pedal, a braking force generated in the electronic mechanical brake 100 increases temporarily, and when the braking force is released, the braking force decreases to zero. Generation of the braking force is similar to the graph of the current flowing in the actuator.

On the other hand, in the parking braking interval, a predetermined braking force is generated in the electronic mechanical brake 100. In the parking braking interval, although a current value of the upper graph is zero, a braking force is generated in the electronic mechanical brake 100.

That is, in the electronic mechanical brake 100 according to one embodiment of the present disclosure, a solenoid or a small motor which requires a current when generating a parking braking force is not used unlike the conventional electronic mechanical brake.

That is, since the self-locking state, in which the spindle 120 may no longer move forward to the left, is maintained, the solenoid or motor may not be used. Accordingly, even when an engine is turned off, a parking braking force can be maintained without consuming current.

Figure 4:
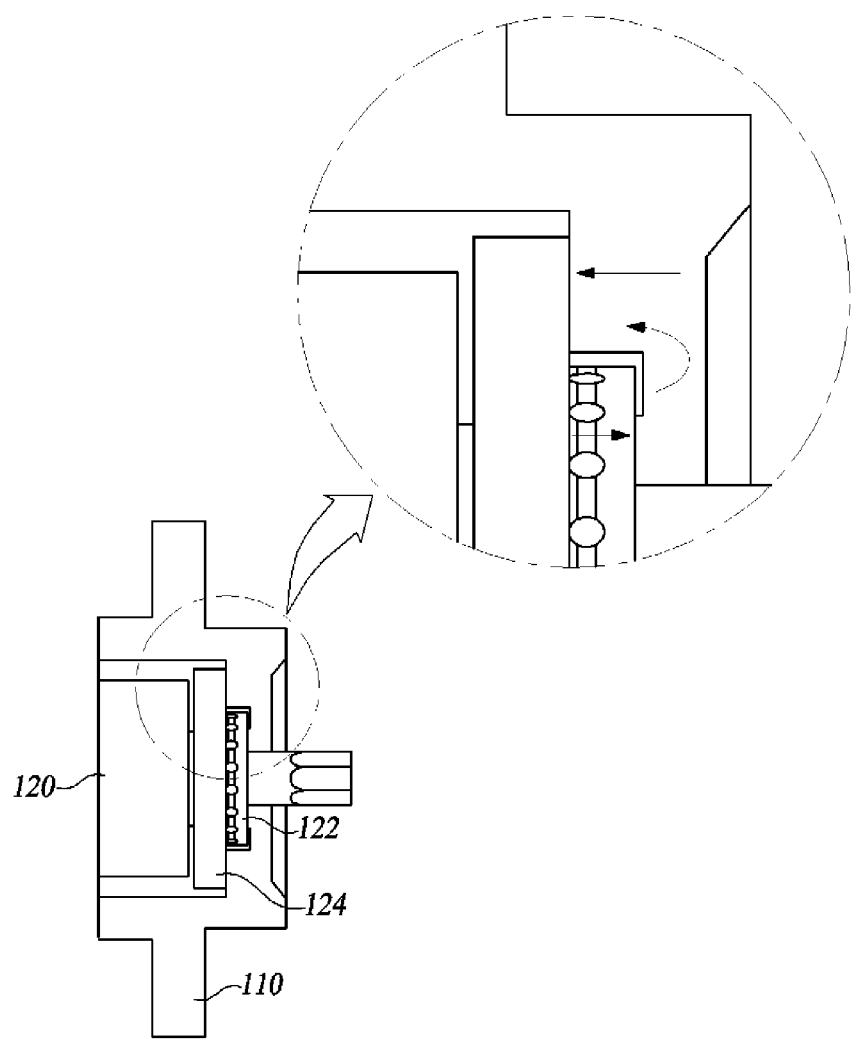
FIG. 4 is a side cross-sectional view illustrating a load applied to the electronic mechanical brake according to one embodiment of the present disclosure.

FIG. 4 is a side cross-sectional view illustrating a load applied to the electronic mechanical brake according to one embodiment of the present disclosure.

An arrow of FIG. 4 indicates a direction in which a load is applied.

Referring to FIG. 4, when the thrust bearing 122 presses the thrust bearing support portion 111, the bending portion 112 receives a load and is deformed. As the bending portion 112 is deformed, the friction force transmission portion 113 is pressed to the left such that the gap d becomes narrower. Accordingly, the friction force transmission portion 113 presses the flange portion 124. As the flange portion 124 comes into contact with the friction force transmission portion 113 and receives a friction force, the spindle 120 does not rotate so that the flange portion 124 enters a self-locking state. That is, as the friction force transmission portion 113 presses the flange portion 124, a parking braking force is generated.

Although exemplary embodiments of the present disclosure have been described for illustrative purposes, those skilled in the art will appreciate that various modifications, additions, and substitutions are possible, without departing from the idea and scope of the present disclosure. Therefore, exemplary embodiments of the present disclosure have been described for the sake of brevity and clarity. The scope of the technical idea of the present embodiments is not limited by the illustrations. Accordingly, one of ordinary skill would understand the scope of the present disclosure is not to be limited by the above explicitly described embodiments but by the claims and equivalents thereof.

What is claimed is:

1. An electronic mechanical brake including a piston which is movable forward or rearward in an axial direction and moves forward in the axial direction during a normal braking to press a friction pad provided to clamp a disc, and an actuator which provides a rotational force to move the piston, the electronic mechanical brake comprising:
   a spindle which includes a thrust bearing and a flange portion, is coupled to the piston to rotate according to the rotational force, and is configured to move the piston forward or rearward; and
   a caliper body which includes:
   a thrust bearing support portion in contact with the thrust bearing;
   a friction force transmission portion which is positioned radially outside the thrust bearing support portion and spaced apart from the flange portion by a gap, and comes into contact with the flange portion as the gap becomes narrower according to a linear movement of the spindle; and
   a bending portion which is positioned radially between the thrust bearing support portion and the friction force transmission portion and connects the thrust bearing support portion and the friction force transmission portion,
   wherein the thrust bearing support portion has a thickness which is relatively greater than a thickness of the bending portion so that the thrust bearing support portion protrudes relatively further than the bending portion in a direction toward the thrust bearing, and
   the bending portion has the thickness which is relatively smaller than the thickness of the thrust bearing support portion, wherein the bending portion is bent to allow the friction force transmission portion, which is spaced apart from the flange portion by the gap in the axial direction before a parking braking force is generated, to come into contact with the flange portion of the spindle so as to transmit a friction force when the thrust bearing presses the thrust bearing support portion.

2. The electronic mechanical brake of claim 1, wherein:
   the caliper body further includes a high load supporting portion positioned radially outside the friction force transmission portion; and
   the high load supporting portion distributes a part of a load received by the friction force transmission portion from the thrust bearing.

3. The electronic mechanical brake of claim 2, wherein the high load supporting portion is configured to be relatively thicker than the friction force transmission portion.

4. The electronic mechanical brake of claim 1, wherein the friction force transmission portion is formed to be relatively thicker than the thrust bearing support portion.

5. The electronic mechanical brake of claim 1, wherein the bending portion is deformed in a direction in which the gap becomes narrower when the thrust bearing support portion is pressed by the thrust bearing.

6. The electronic mechanical brake of claim 3, wherein the high load supporting portion includes a thickness-increasing portion that at least partially overlaps the flange portion of the spindle in the axial direction.

\* \* \* \* \*